(12) United States Patent  
Hori (10) Patent No.: US 7,570,837 B2  
(45) Date of Patent: Aug. 4, 2009

(54) SHADING CORRECTION APPARATUS AND IMAGE SENSING

(75) Inventor: Masashi Hori, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 665 days.

(21) Appl. No.: 11/403,412

(22) Filed: Apr. 12, 2006

(65) Prior Publication Data

US 2006/0244848 A1  Nov. 2, 2006

(30) Foreign Application Priority Data

Apr. 18, 2005  (JP) .............................. 2005-120009

(51) Int. Cl.  
*G06K 9/40* (2006.01)
(52) U.S. Cl. .................................... 382/274
(58) Field of Classification Search ......... 382/274–275, 382/254, 162, 167; 358/3.26–3.27, 461, 358/516, 518; 348/221.1, 223.1, 224.1, 251, 348/347, 241, 263  
See application file for complete search history.

(56) References Cited

U.S. PATENT DOCUMENTS 4,827,333 A * 5/1989 Iwabe .......................... 348/263  
5,818,523 A 10/1998 Ban  
6,937,777 B2 * 8/2005 Shirakawa .................. 382/274  
7,460,728 B2 * 12/2008 Kawanishi et al. .......... 382/274

FOREIGN PATENT DOCUMENTS

| JP | 8-294133 | 11/1996 |
|---|---|---|
| JP | 2000-41179 | 2/2000 |
| JP | 3121760 | 10/2000 |
| JP | 2002-57927 | 2/2002 |

* cited by examiner

*Primary Examiner*—Sherali Ishrat  
(74) *Attorney, Agent, or Firm*—Canon U.S.A., Inc., IP Division (57) ABSTRACT

An invention that prepares in advance shading correction value for a plurality of discrete zoom positions is disclosed. For frame images sensed at zoom positions for which shading correction values are not provided, a correction value is obtained from shading correction values provided for zoom position closest to the zoom position in the telephoto direction and in the wide-angle direction at the time the image was sensed and shading correction performed, enabling proper shading correction to be performed on each frame image during zoom image sensing while economizing on memory capacity.

7 Claims, 9 Drawing Sheets

SHADING CORRECTION APPARATUS AND IMAGE SENSING

FIELD OF THE INVENTION

The present invention relates to digital still camera shading correction technology in an image sensing apparatus such as a digital still camera, a video camera or the like, and more particularly, to shading correction technology suitable for an image sensing apparatus having an optical zoom capability.

BACKGROUND OF THE INVENTION

Shading correction is a technology for controlling the effect on an image of a dropping in the amount of peripheral light that is a characteristic of lenses. In general, the shorter the focal distance of the lens (the wider the angle) or the smaller the f-stop, the greater the peripheral light dropping. As a result, it is undesirable to apply the same correction conditions to all image sensing conditions (that is, zoom positions and f-stops)

For example, Japanese Laid-Open Patent Application Publication Nos. 2000-41179 and 8-294133 disclose a mechanism that pre-stores correction conditions for every possible image sensing condition that can arise and obtains a correction value based on the image sensing conditions obtained from the lens. This conventional structure is described using FIG. 4.

Figure 4:
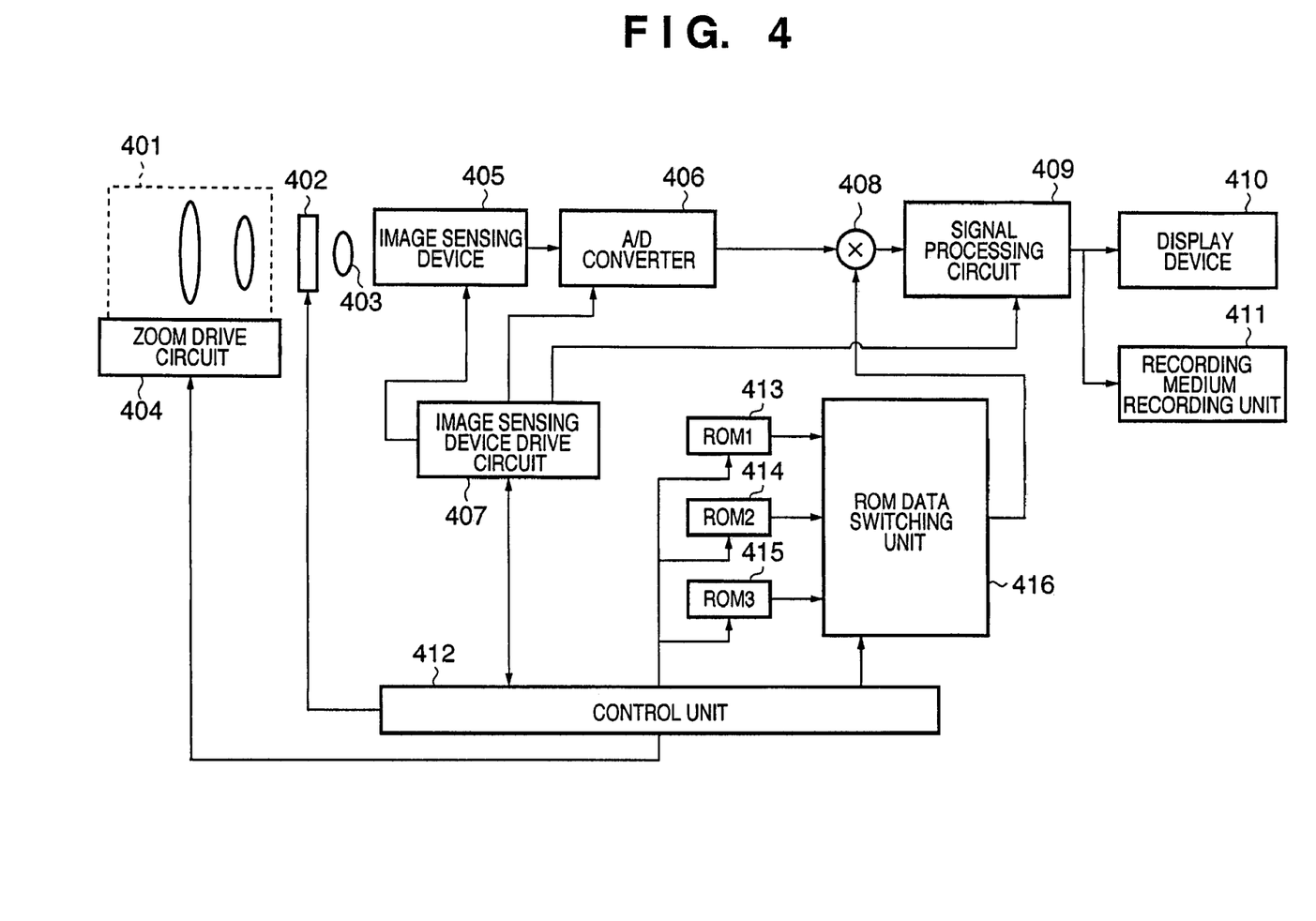
FIG. 4 is a block diagram showing a structural example of a conventional digital still camera having a shading correction capability.

FIG. 4 is a block diagram showing a structural example of those portions that relate to shading correction in a conventional image input apparatus.

In the image input apparatus described above, light passing through a zoom lens 401, a stop 402 and a focus lens 403 is converted by an image sensing device 405 into an electrical signal at each pixel, and, after being read out in sequence by an image sensing device drive circuit 407, is converted into a digital signal by an A/D circuit 406. At the same time, shading correction data corresponding to the f-stop, zoom position and lens type is pre-registered in a ROM1 (413), a ROM2 (414) and a ROM3 (415), and a controller 412 supplies address signals corresponding to the pixel positions to these ROM.

The controller 412 acquires the zoom lens 401 image sensing conditions and supplies them to a ROM data switching unit 416. Depending on the zoom lens 401 image sensing conditions received from the controller 412, the ROM data switching unit 416 outputs to a multiplier 408 the output value of that ROM has the appropriate data from among ROM 1-3 (413-415).

The multiplier 408 performs shading correction for each pixel by multiplying the digital signal from the A/D circuit 406 by the shading correction value that is the output of the ROM data switching unit 416. The corrected pixel signal is then subjected to predetermined image processing by a signal processing circuit 409, such as color interpolation, white balance, encoding and the like, and the processed image is then displayed on a display device 410 and/or recorded on a recording medium such as a memory card or the like by a recording medium recording unit 411.

Thus, as described above, by obtaining and registering in advance correction values for every possible combination of lens type, zoom position and f-stop, in theory suitable shading correction is possible. In practice, however, with the structure described above it is difficult to be able to perform proper shading correction under all image sensing conditions.

Under the image sensing conditions described above, there are not very many combinations of lens type and f-stop, and if the apparatus is a fixed lens type the number of f-stops alone will suffice. However, the number of values that can be derived from the zoom position alone is very great. Particularly with recent increased demand for high picture quality there is also an increasing emphasis on optical zoom capabilities that provide zooming without deterioration in picture quality, and therefore high-magnification zoom lenses have come to be used. Even a compact digital still camera commonly mounts at least a 3× optical zoom lens, and even 6×-10× optical zoom lenses are not unusual. In addition, video cameras mount at least an 8× optical zoom lens, and usually a 10-12× optical zoom lens.

In devices that use such high-power optical zoom lenses as these, it is very inconvenient to prepare correction values for all possible zoom positions. In addition, shading correction is performed at each pixel of the image sensing device, and therefore, as the number of pixels packed onto a single image sensing device continues to increase to the point where image sensing devices with pixel densities of 4-6 million pixels are now common, it can be easily understood that the amount of shading correction data involved for a single combination also increases dramatically.

In order to eliminate the inconvenience of preparing correction values in advance and to economize on the memory capacity required to store those correction values, it is possible to perform correction by selecting a limited number of zoom positions for which correction values are prepared and using the correction value that corresponds to the prepared zoom position that is closest to the actual zoom position. However, recently, and particularly with electronic still cameras, in order to make such devices smaller and thinner, there is a trend toward increasingly strong demand for smaller and thinner optical systems including optical zoom lenses as well. As a result, shading (a drop in the amount of light at the periphery of the lens) increases with distance from the optical axis of the lens, and furthermore, the shading characteristics due to zoom position also tend to fluctuate greatly. Under these circumstances, using a correction value corresponding to a different zoom position reduces correction accuracy.

Figure 5:
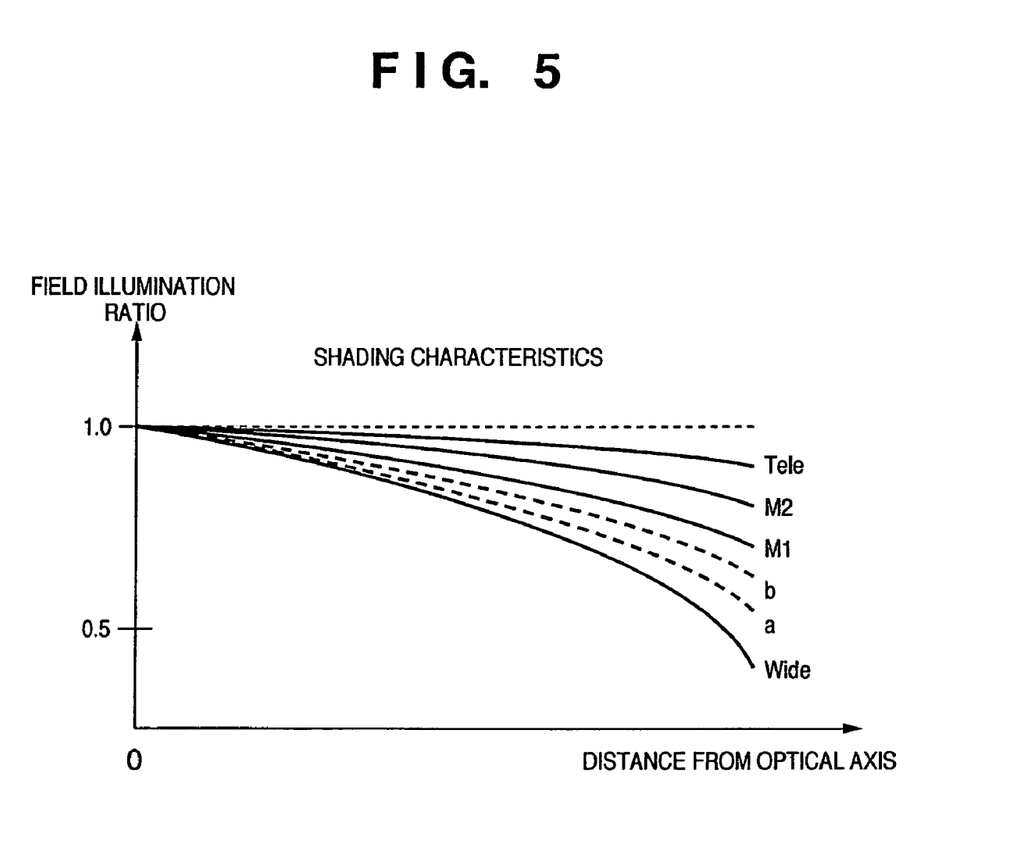
FIG. 5 is a diagram showing an example of shading characteristics versus distance from an optical axis.

For example, in the case of an optical zoom lens having shading characteristics like those shown in FIG. 5, correction values are prepared for discrete positions intermediate between the wide-angle end (Wide) and the telephoto end (Tele) (for example, the four positions Wide/M1/M2/Tele). For zoom positions for which no correction values are provided, the correction value that is closest to that zoom position is selected from among the group Wide, M1, M2, Tele, as well as the correction value of the zoom position in the wide-angle direction.

In this case, assume, for example, that the optical zoom lens magnification (zoom position) is changed continuously from Wide to M1. In this instance, at intermediate zoom positions a, b the Wide correction value is applied. As a result, however, proper correction is not performed for intermediate zoom positions.

Figure 6:
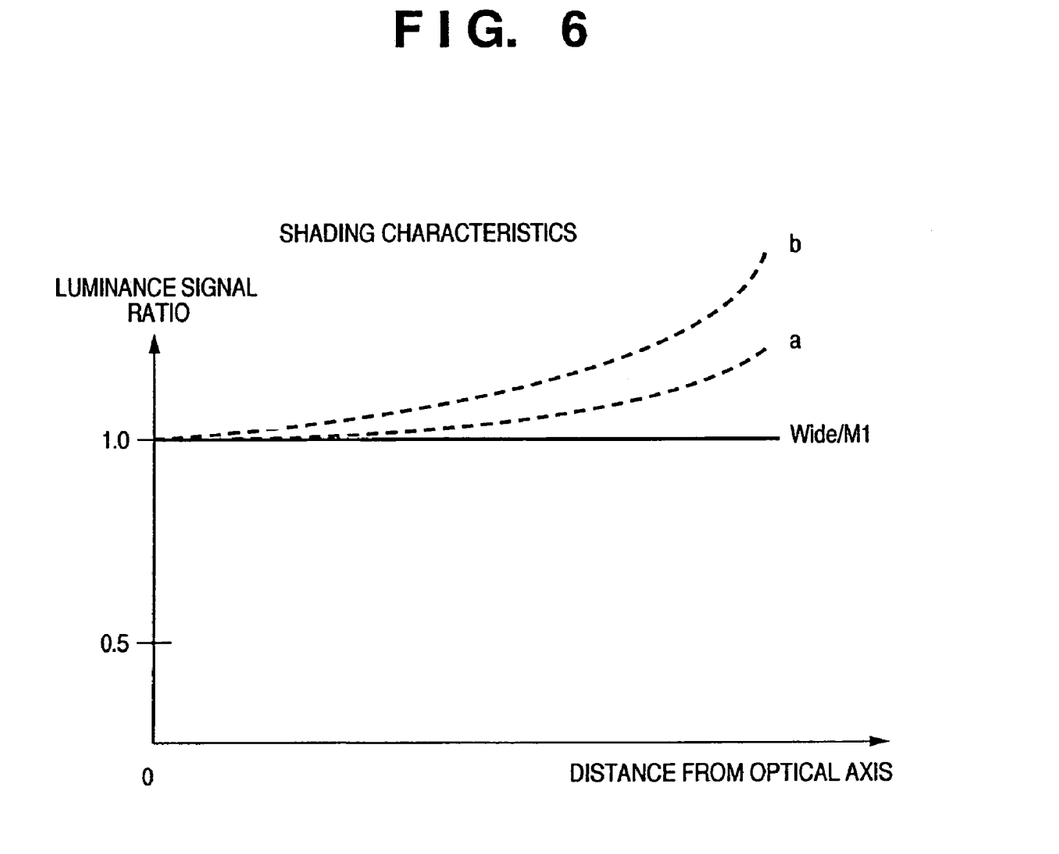
FIG. 6 is a diagram illustrating over-correction due to conventional shading correction.

FIG. 6 shows shading-corrected luminance levels at these intermediate positions (normalized to the luminance at the center of the optical axis). As shown in the diagram, when the zoom position is at Wide, M1, proper shading correction suited to each of these positions is performed, so that there is no difference in luminance level between the center of the optical axis and periphery. As the zoom lens moves from Wide in the telephoto direction and reaches position a, shading correction corresponding to Wide is performed. In this case, as indicated by "a" in FIG. 6, the luminance level increases from the center of the optical axis (point 0) toward the periphery, in a state of over-correction.

As the zoom position moves further in the telephoto direction and reaches position b, over-correction due to application of the correction value corresponding to Wide increases further. Then, when the zoom position moves from b to M1, shading correction appropriate for M1 is performed and a flat luminance level at M1 like that at the center of the optical axis is obtained.

Thus, as described above, using shading correction values corresponding to a position in the wide-angle direction for an intermediate zoom position leads to over-correction, and conversely, using shading correction values corresponding to a position in the telephoto direction for an intermediate zoom position leads to under-correction. As a result, for example, when carrying out moving-image image sensing while zooming continuously from Wide to M1, a switch between an image that has been properly corrected and the post-corrected image becomes evident as an abrupt change in luminance in the sensed moving image. Such image switching includes, for example, a switch from an error-corrected image at an intermediate position to a properly corrected image at M1.

Thus, as described above, with the conventional structure, achieving proper correction at a given zoom position entails either inordinate inconvenience and memory capacity consumption or allowing error correction.

SUMMARY OF THE INVENTION

The present invention is conceived in light of the problems of the conventional art described above, and has as its object to achieve proper shading correction at any given zoom lens position while controlling the amount of memory capacity consumption.

According to the present invention, the foregoing object is attained by providing a shading correction apparatus performing shading correction of an image sensed by driving a zoom lens so as to conduct exposure while moving the lens, the apparatus comprising:

a storage unit that stores shading correction values at a plurality of discrete zoom positions determined in advance from among all possible zoom positions of the zoom lens;

a calculation unit that calculates a shading correction value to be applied to an image for which the zoom position at the time the image was sensed is not one of the plurality of discrete zoom positions using the shading correction values stored in the storage unit; and a correction unit that applies the shading correction value calculated by the calculation unit, wherein the calculation unit sets a zoom lens position according to a zooming speed and calculates the shading correction value.

According to another aspect of the present invention, the foregoing object is attained by providing a shading correction method for performing shading correction of an image sensed by an image sensing apparatus having a zoom lens, the method comprising:

a storage step of storing shading correction values at a plurality of discrete zoom positions determined in advance from among all possible zoom positions of the zoom lens; and a calculation step of calculating a shading correction value to be applied to the sensed image from the shading correction values stored in the storage unit; and a correction step that applies the shading correction value calculated in the calculation step, wherein the calculation step sets a zoom lens position according to a zooming speed and calculates the shading correction value.

With such a construction, the present invention makes it possible to achieve proper shading correction at any given zoom lens position while controlling the amount of memory capacity consumption.

Other objects, features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings. It should be noted that although the following embodiments illustrate a case in which the present invention is adapted to a digital still camera, the present invention is not limited thereto and can be adapted to any image input apparatus that uses a zoom lens or an image sensing device.

First Embodiment (Structure of the Digital Still Camera)

Figure 1:
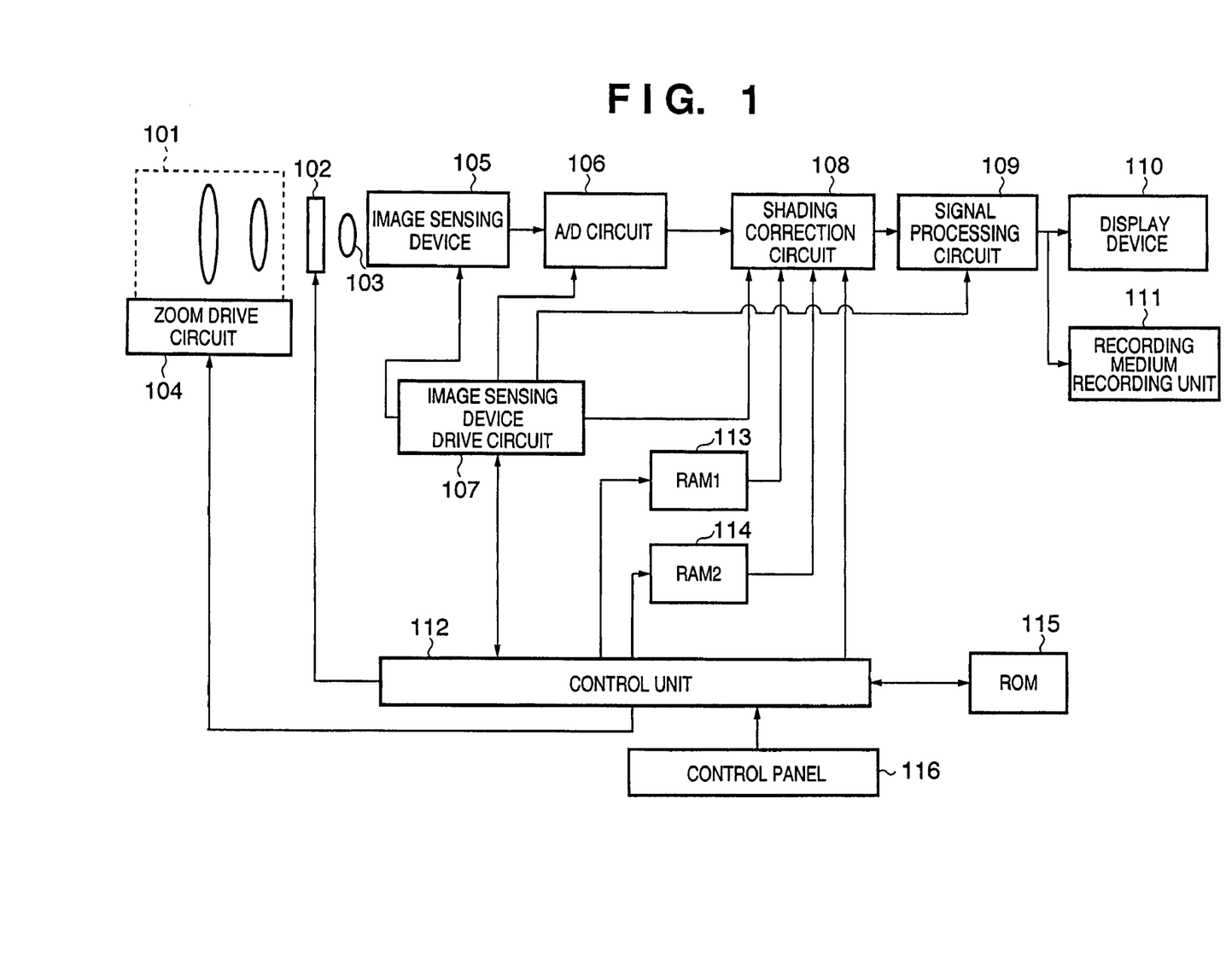
FIG. 1 shows a structural example of a digital still camera employing a shading correction apparatus according to an embodiment of the present invention.

FIG. 1 is a block diagram showing a structural example of a digital still camera as one example of an image sensing apparatus employing a shading correction apparatus according to an embodiment of the present invention.

In the digital still camera shown in FIG. 1, an optical image of an object passing through an zoom lens 101 driven by a zoom drive circuit 104, a stop means 102 and a focus lens 103 is converted into an electrical signal by an image sensing device 105. The electrical signal that the image sensing device 105 outputs is then converted by an A/D circuit 106 into digital image data, and corrected by a shading correction circuit 108 according to the zoom position of the zoom lens 101 and the stop.

Although described in detail later, in the present embodiment, the shading correction circuit 108 uses a plurality of shading correction values stored in a RAM1 (113) and a RAM2 (114) and generates shading correction values appropriate to image sensing conditions at any given time. The shading-corrected image data is then subjected by a signal processing circuit 109 to certain predetermined signal processing, such as color interpolation, white balance, encoding and the like. The processed image is then displayed on a display device 110 and/or recorded on a recording medium such as a memory card or the like by a recording medium recording unit 111.

An image sensing device drive circuit 107 supplies a plurality of timing pulses to the image sensing device 105, the A/D circuit 106, the shading correction circuit 108, the signal processing circuit 109 and to a control unit 112. The control unit 112 has, for example, a CPU, RAM and ROM, and executes a control program stored in the ROM to control the digital still camera as a whole.

The ROM115 stores a plurality of shading correction values for discrete combinations of image sensing conditions, specifically, all combinations of discrete individual zoom positions and f-stops, and transfers the plurality of shading correction values to RAM1 (113), RAM2 (114) in response to the control unit 112. In addition, there is a control panel 116, which is an input apparatus including keys, buttons and the like that the user uses to input instructions to the digital still camera. The control panel 116 also contains buttons for starting and stopping image sensing as well as a zoom lever for inputting instructions to change the magnification of the zoom lens between the wide-angle and the telephoto directions. The control unit 112 monitors the operation of the control panel 116, and when the zoom lever is operated supplies instructions according to that operation to the zoom drive circuit 104. In response to instructions from the control unit 112, the zoom drive circuit 104 drives the zoom lens 101 to move the zoom position in the wide-angle direction or the telephoto direction. In addition, the zoom drive circuit 104 has the capacity to acquire position information on the zoom lens 101, by which the control unit 112 can obtain zoom lens 101 position information. The control unit 112 can also acquire the value (f-stop) of the stop 102.

It should be noted that the digital still camera has many other structure besides those shown in FIG. 1, and mainly only those structure related to shading correction are sown in FIG. 1.

(Structure of the Shading Correction Circuit)

Figure 2:
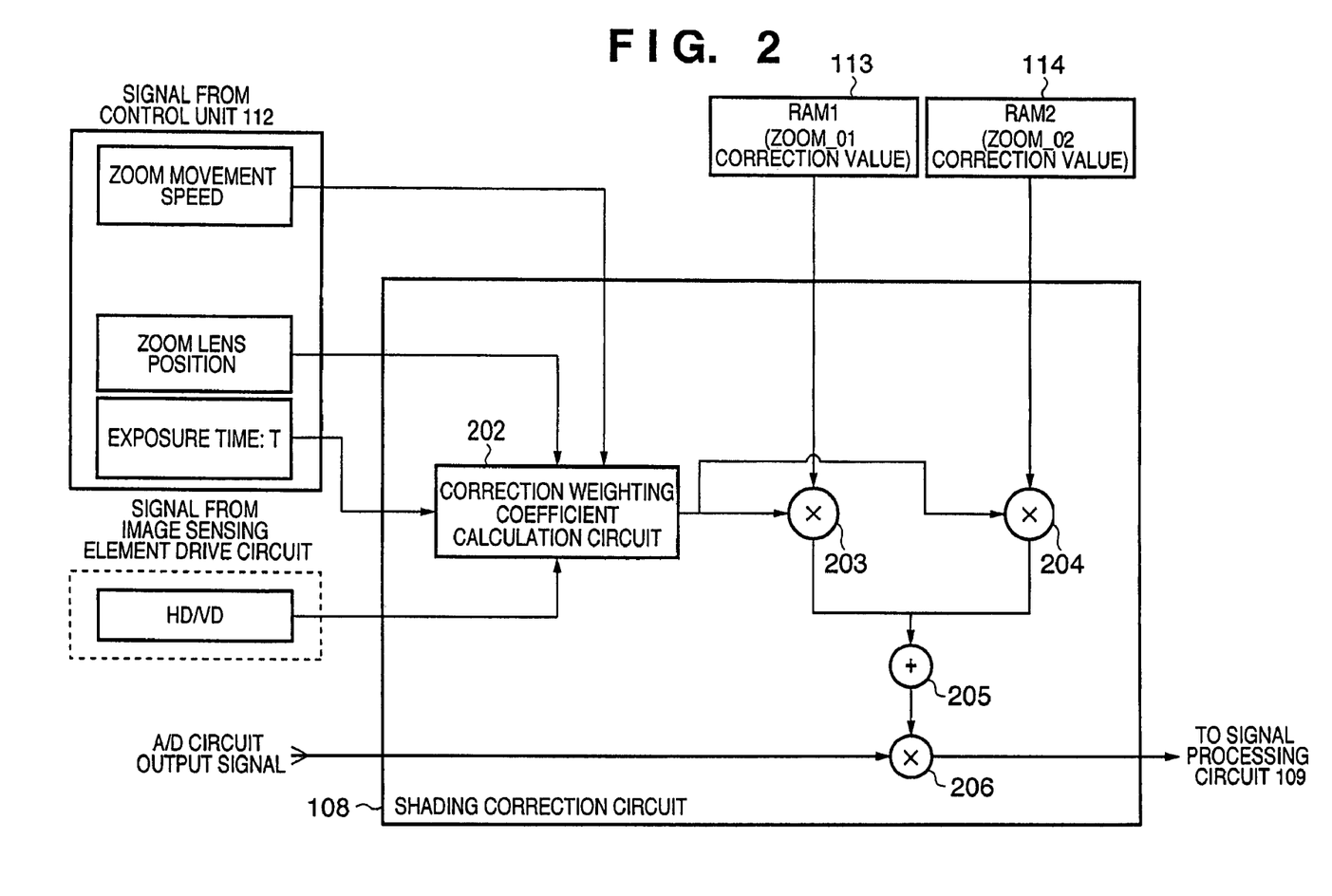
FIG. 2 is a block diagram showing a structural example of a shading correction circuit of a first embodiment of the invention.
Figure 3:
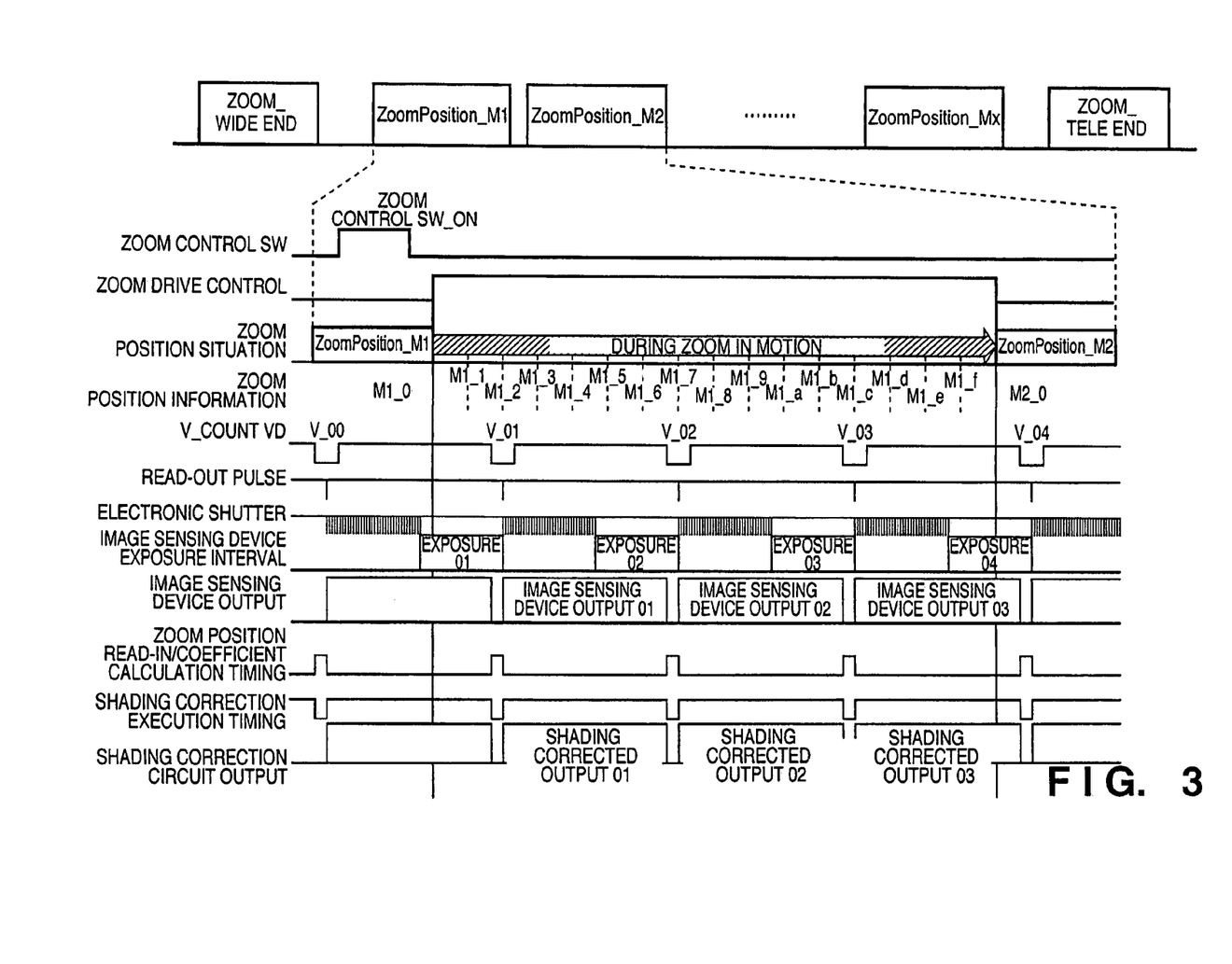
FIG. 3 is a timing chart for a shading correction process of an embodiment of the invention.

A detailed description is now given of the shading correction process using FIGS. 2 and 3. FIG. 2 is a block diagram showing a structural example of the shading correction circuit 108, and FIG. 3 is a timing chart for illustrating the operation of the shading correction circuit 108.

For explanatory convenience, within the zoom range of the zoom lens 101 the wide-angle end position is called the Zoom_Wide end and the telephoto end position is called the Zoom_Tele end. In addition, discrete zoom positions intermediate between the Zoom_Wide end and the Zoom_Tele end are referred to, starting from the Zoom_Wide end side and moving toward the Zoom_Tele end side, as ZoomPosition_M1, ZoomPosition_M2, ... ZoomPosition_Mx. What is described below is a situation in which the zoom position is changed from ZoomPosition_M1 to ZoomPosition_M2 in the telephoto direction in accordance with an instruction from the control unit 112 (see FIG. 1) during sensing of a moving image.

In addition, in the present embodiment, it is assumed that, of the discrete zoom positions for which correction values are pre-registered, the image sensing apparatus has the ability to detect the position of the zoom lens by resolving the zoom lens position between ZoomPosition_M1 and ZoomPosition_M2 into N fractions. This resolution is indicated as zoom position information in FIG. 3. Approximately three exposures are performed while the zoom lens is moving from ZoomPosition_M1 to zoom stopping position ZoomPosition_M2, and the zoom position at each of these three exposures is different.

Examining the interval between V_01 and V_02 shown in FIG. 3 (exposure interval 02), it can be seen that at the start of exposure, which is determined by an electronic shutter, the zoom lens is positioned at a location that corresponds approximately to M1_5, and that at the end of exposure the lens is positioned at a location that corresponds approximately to M1_7. Therefore, the zoom lens position changes in the interval during exposure, and the amount of shading, which depends on the zoom lens position, also changes between the start of exposure and the end of exposure. The entire amount of shading during the exposure interval corresponds to the average amount of shading that is itself determined by the all the zoom lens positions from the start of exposure to the end of exposure.

The zoom lens position at the start of exposure can be calculated from the exposure time, results of the detection of the zoom position near the end of exposure, the zoom lens position at the end of exposure of the preceding frame, and the speed of movement of the zoom lens. Furthermore, from the shading correction values on the ROM, two types of correction values corresponding to the two zoom lens stopping positions adjacent to the current zoom lens position are stored in RAM1 (113) and RAM2 (114) shown in FIG. 1 (and FIG. 2). In the present embodiment, shading correction tables for ZoomPosition_M1 and ZoomPosition_M2 are stored. Then, the circuit that determines the correction value from these two shading correction tables and from the zoom positions at the beginning of exposure and at the end of exposure and carries out correction is the shading correction circuit 108 shown in FIG. 2.

In FIG. 2, the shading correction circuit 108 acquires the following information as signals from the control unit 112: Zoom movement speed (mm/sec), frame rate (number of frames/sec), zoom lens position and exposure time (T). In addition, the shading correction circuit 108 acquires a horizontal sync signal (HD) and a vertical sync signal (VD) from the image sensing device drive circuit 107.

The zoom movement speed may, for example, be the time required for the zoom lens to move between two adjacent zoom lens stopping points having shading correction tables. Here, the time required to move the lens between ZoomPosition_M1 and ZoomPosition_M2 is called Z_sp. Such zooming speed during moving image recording can be set slower than during non-moving image recording (that is, during such operations as still-image recording, or sensing a moving image and displaying that moving image on the display device 110). Such slower setting may be employed because, whereas the proper recording of continuity (recording during zooming) is sought in the case of moving image recording, by contrast, in the case of still image recording, image sensing after zooming is the desired operation, and therefore reaching the user's desired zoom magnification quickly enhances usability.

In the present embodiment, when the zoom position when a given frame is sensed (at the start of exposure) is not a ZoomPosition, a correction value calculated by applying a predetermined weight to the shading correction values provided for the nearest ZoomPosition in both the telephoto direction and the wide-angle direction is applied. The coefficients used for this weighting are obtained by a correction weighting coefficient calculation circuit 202.

The correction weighting coefficient calculation circuit 202 calculates a weighting coefficient a to be multiplied by the shading correction table at ZoomPosition_M1 and a weighting coefficient b to be multiplied by the shading correction table at ZoomPosition_M2. It should be noted that the respective correction tables (Sh_M1 and Sh_M2) are supposed to be stored in the RAM1 and the RAM2. In addition, it should be noted that, when the lens position at the start of exposure is ZoomPosition_M1, the correction weighting coefficient calculation circuit 202 outputs weighting coefficients (a,b)=(1.0), so that the correction value stored in the RAM1 is applied as is. Furthermore, it should be noted that, when the lens position exceeds the ZoomPosition, a process of updating RAM1, RAM2 that is described later is performed, and thus the weighting coefficients (a,b)≠(0,1).

The weighting coefficient a and the weighting coefficient b are multiplied by correction tables Sh_M1 and Sh_M2, respectively, at a multiplier 203 and at a multiplier 204, respectively, and both results are added by an adder 205 and then multiplied at a multiplier 206 by the pixel signal output by the A/D circuit 160 so as to perform shading correction at each pixel for a single frame during zoom lens movement.

The shading correction operation is performed for all frame images sensed while the zoom lens is moving between discrete zoom lens positions for which shading correction tables are prepared in advance.

In other words, as shown in FIG. 3, during the interval from V_02 to V_03 in which the image sensing device reads out the image data exposed at exposure 02, a shading correction value calculated using the weighting coefficients (a_02, b_02) at exposure 02 is applied to the image sensing device output (the A/D circuit output) 02. Then, for the image data of exposure 03, which is the succeeding frame, the weighting coefficients are switched from (a_02, b_02) to (a_03, b_03) from the end of read-out from the image sensing device of exposure 02 to the beginning of read-out from the image sensing device of exposure 03, enabling a shading correction value calculated using the weighting coefficients (a_03, b_03) of exposure 03 to be applied to the output 03 of the image sensing device 105 during the interval from V_03 to V_04.

When the zoom lens movement speed is slow, or when the exposure time is short, (T/Z_sp)≦1, that is, n≦N. Here, T is the exposure time (in seconds), N is the position detection resolution between ZoomPosition_M1 and ZoomPosition_M2, and n is the zoom lens position at the time exposure ends. In this case, the equations used to calculate the weighting coefficients (a,b) described above are as follows:

$$a=(N-n)/N+0.5*(T/Z\_sp)$$

$$b=n/N-0.5*(T/Z\_sp)$$

It should be noted that, in this embodiment, N and n denote the resolution and the position from ZoomPosition_M1 when exposure ends, respectively. However, it is also possible to substitute the distance between ZoomPosition_M1 and ZoomPosition_M2 for N and to substitute the distance from ZoomPosition_M1 when exposure ends for n.

Therefore, the shading correction amount for a given frame between ZoomPosition_M1 and ZoomPosition_M2 may be expressed as follows:

$$Sh\_table=Sh\_M1*\{(N-n)/N+0.5*(T/Z\_sp)\}+Sh\_M2*\{n/N-0.5*(T/Z\_sp)\} \quad (1)$$

This is because less disagreeable correction results can be obtained by increasing the weighting to the shading correction value when exposure starts.

When the zoom lens movement speed is slow, or when the exposure time is short, if (T/Z_sp) is sufficiently small, then the shading correction value can be approximated in the following manner:

$$Sh\_table \cong Sh\_M1*(N-n)/N+Sh\_M2*n/N \quad (2)$$

As a result, the coefficient can be produced with the correction weighting coefficient calculation circuit 202 shown in FIG. 2 so as to compare (T/Z_sp) to a predetermined value and carry out correction using either the shading correction value according to the approximation method (equation (2)) where (T/Z_sp) is smaller than the predetermined value or the shading correction value obtained using equation (1) where (T/Z_sp) is greater than the predetermined value.

By contrast, when the amount of movement during exposure is large, (T/Z_sp)>1, and therefore n=N. Substituting (T/Z_sp)=1, the equations for calculating the weighting coefficients (a,b) are as follows:

$$a=0+0.5*1=0.5$$

$$b=1-0.5*1=0.5$$

Therefore, the shading correction amount for a given frame between ZoomPosition_M1 and ZoomPosition_M2 is:

$$Sh\_table=Sh\_M1*0.5+Sh\_M2*0.5$$

Figure 8:
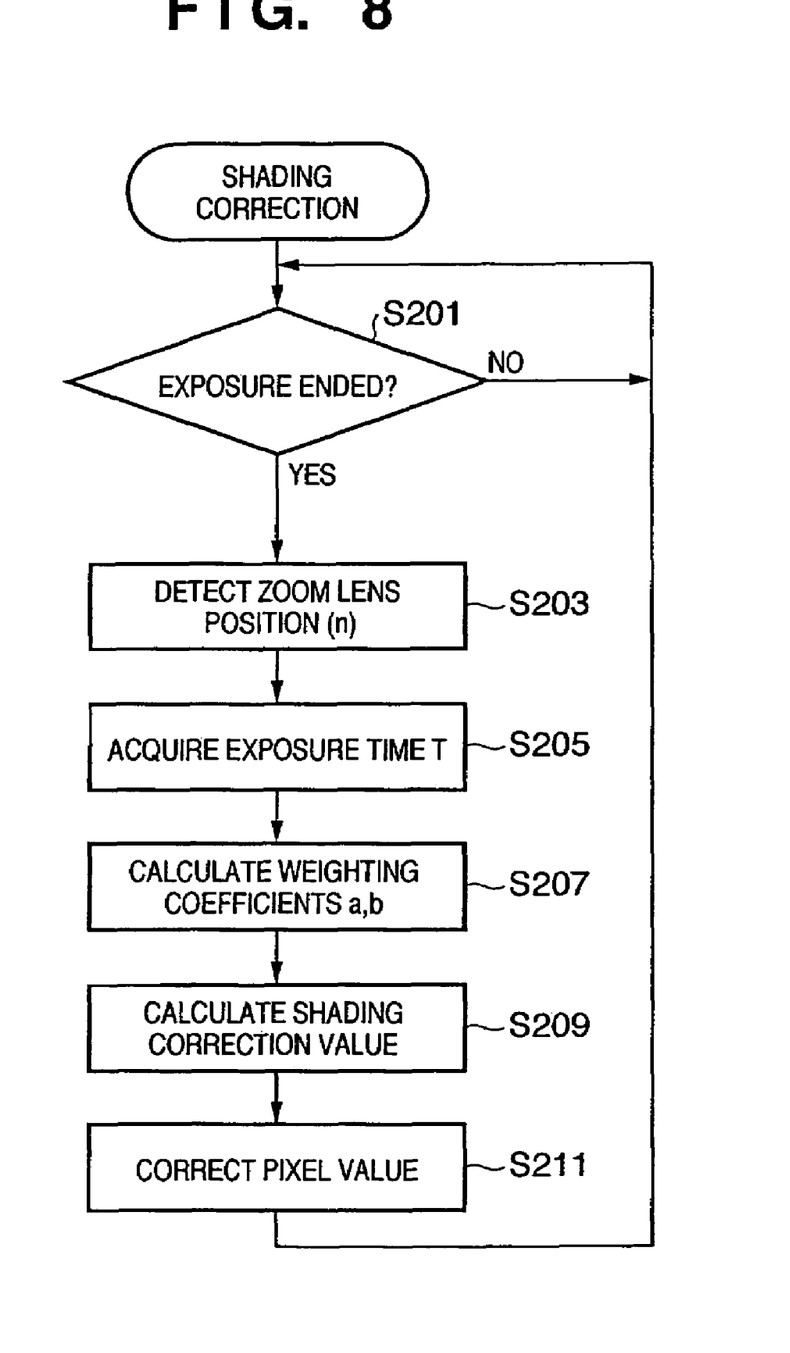
FIG. 8 is a flow chart illustrating a shading correction process operation in the first embodiment.

FIG. 8 is a flow chart illustrating steps in the correction process performed by the shading correction circuit of the present invention.

In step S201, the end of exposure is detected. When exposure ends, a signal from the control unit 112 causes the zoom lens position (n) and the exposure time (T) to be detected (steps S203 and S205). Then, (T/Z_sp) is calculated using the preset (Z_sp), and the weighting coefficients a, b are calculated (step S207) using equation (1) described above if (T/Z_sp) is greater than the predetermined value or equation (2) if (T/Z_sp) is less than the predetermined value.

In the example shown in FIG. 3, the shading correction value is calculated (step S209) from the correction values corresponding to ZoomPosition_M1 and ZoomPosition_M2 stored in the RAM1(113) and RAM2(114) (more accurately, the correction value further corresponding to the f-stop) and the calculated weighting coefficients (a,b), after which correction is performed at each pixel using the shading correction value.

By performing the foregoing process each time exposure ends, it is possible to perform proper shading correction at each sensed frame.

Figure 9:
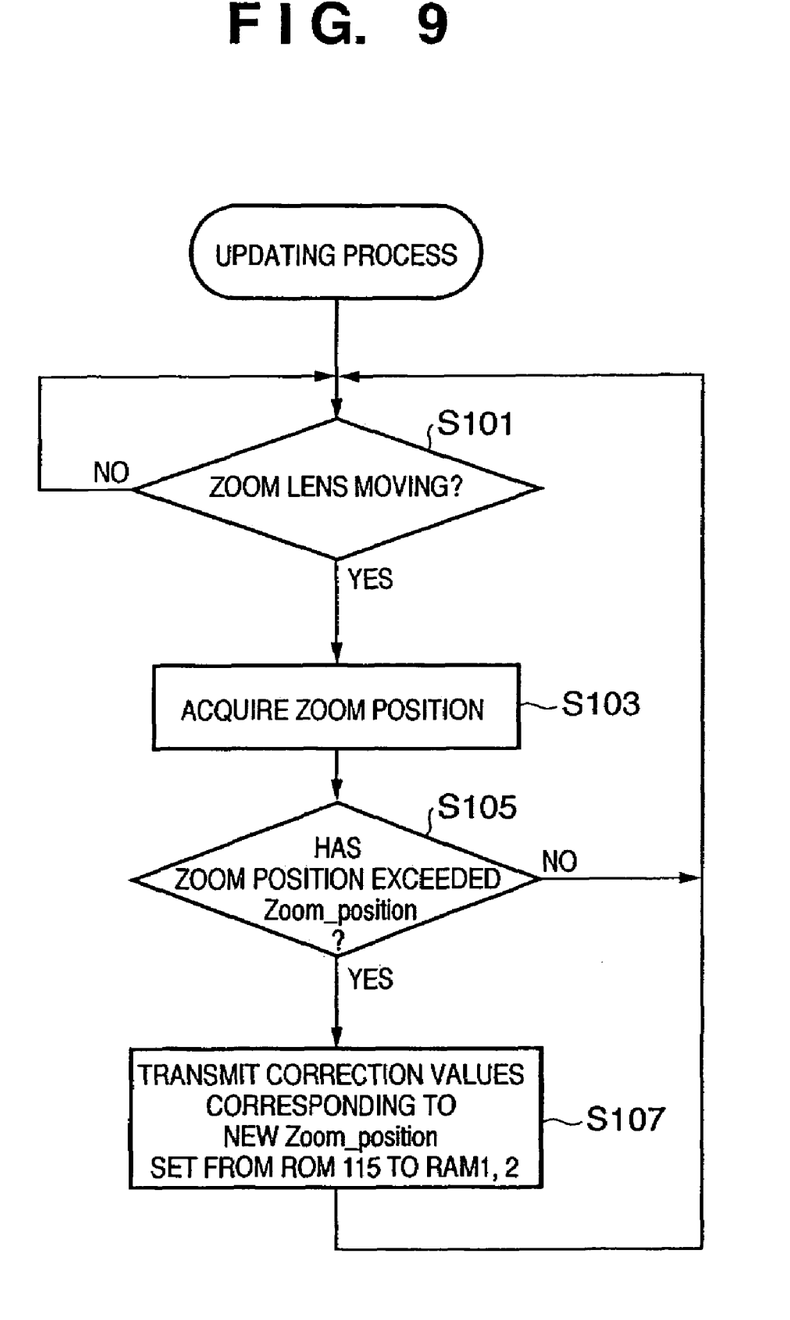
FIG. 9 is a flow chart illustrating a shading correction table update process operation of the embodiment.

Next, a description is given of the RAM1 (113) and RAM2 (114) update operation necessary for performing this type of shading correction, using the flow chart shown in FIG. 9. This operation is performed by the control unit 112.

In step S101, the control unit 112 determines from the zoom drive circuit 104 whether or not the zoom position has changed. If the zoom position has changed, the control unit 112 acquires the newest zoom position (step S103). It should be noted that, alternatively, the control unit 112 may periodically acquire the zoom position from the zoom drive circuit 104 and, depending on whether or not that value has changed, detect whether or not the zoom position has changed.

If the zoom position has changed, then the control unit 112 determines whether or not the zoom position has exceeded ZoomPosition (step S105). If the zoom position has not exceeded the ZoomPosition, then the RAM1 (113) and RAM2 (114) do not need to be updated and processing returns to step S101.

By contrast, if the zoom position has exceeded the ZoomPosition, then the RAM1 (113) and RAM2 (114) are updated so that the shading correction circuit 108 can calculate the proper correction value for each individual frame. In other words, in step S107, the control unit 112 reads out correction values corresponding to the new set of ZoomPositions from the ROM 115 and transmits those correction values to the RAM1 (113) and RAM2 (114). Preferably, such transfer is carried out during the frame sync signal interval.

For example, in a case in which the zoom position exceeds ZoomPosition_M2 in a state in which correction values corresponding to ZoomPosition_M1 and ZoomPosition_M2 are stored in the RAM1 (113) and RAM2 (114) prior to updating, the correction values corresponding to ZoomPosition_M2 and ZoomPosition_M3 are read out from the ROM 115 and transmitted to the RAM1 (113) and RAM2 (114).

The foregoing refreshment process enables the shading correction circuit 108 to calculate the proper correction value at all times.

Thus, as described above, the present embodiment makes it possible to calculate the proper shading correction value for an image sensed at an intermediate position from shading correction values corresponding to discrete zoom positions while taking into account zooming speed and exposure time. As a result, it is possible to perform proper shading correction for each individual moving image sensed while zooming while using only a small amount of memory capacity.

In addition, the present embodiment enables the shading correction coefficients during zoom lens movement to be calculated from the position information during movement of the zoom lens and exposure time as well as from the speed of movement of the zoom lens, so as to provide shading correction that controls fluctuation in luminance signal level caused by error correction due to shading correction during zoom lens movement.

Second Embodiment

The first embodiment of the present invention describes shading correction in a digital still camera capable of detecting positions intermediate between discrete zoom positions for which shading correction tables are prepared. By contrast, a second embodiment of the present invention describes a method of producing a shading correction value for an intermediate position in a case in which positions intermediate between discrete zoom positions for which shading correction tables are prepared cannot be detected. The following description also uses the example shown in FIG. 3.

Figure 7:
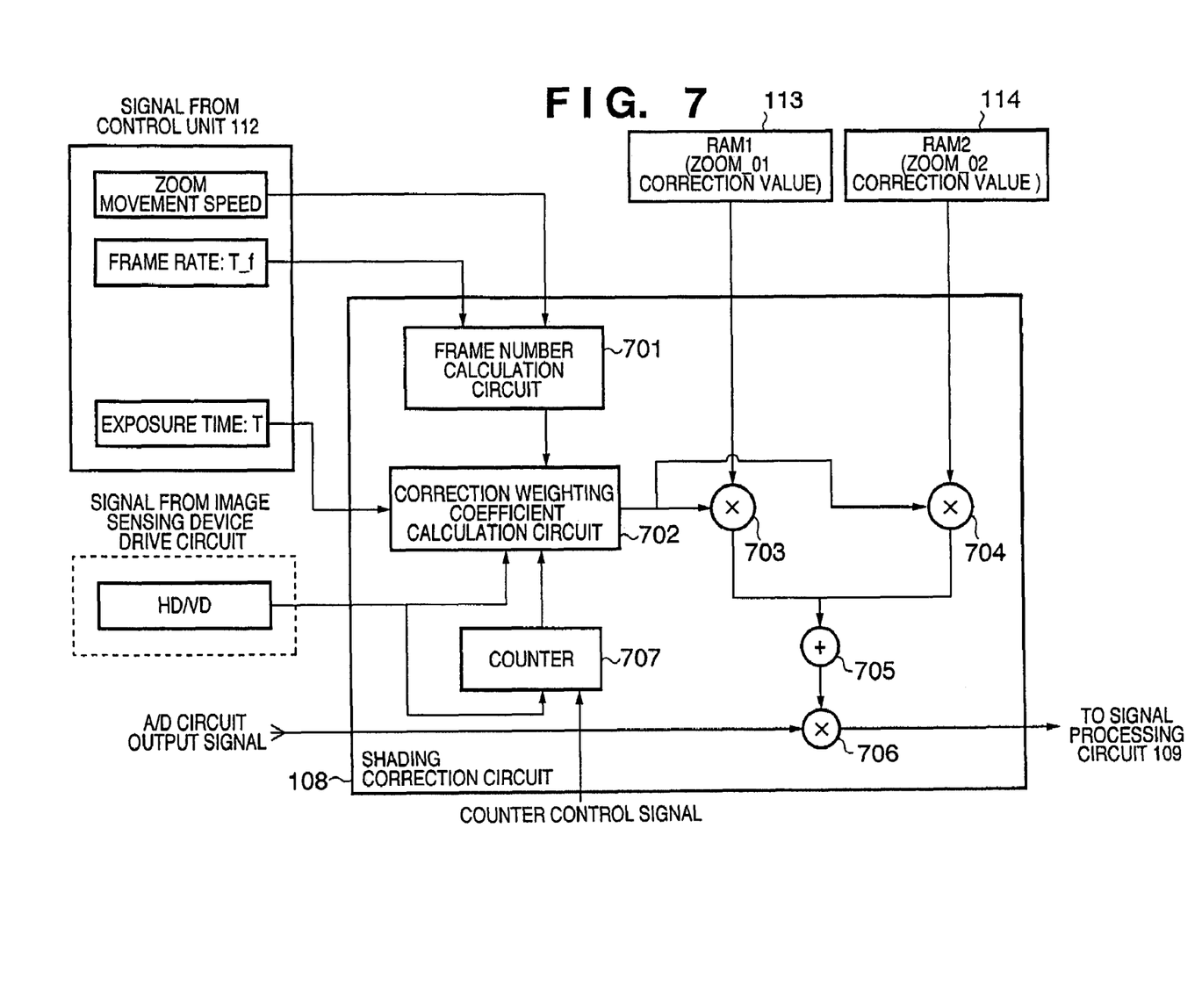
FIG. 7 is a block diagram showing a structural example of a shading correction circuit in a second embodiment of the present invention.

FIG. 7 shows a structural example of the shading correction circuit 108 according to the present embodiment.

In FIG. 7, the shading correction circuit 108 acquires as signals from the control unit 112 a zoom movement speed (mm/sec), a frame rate (sec/frame), an exposure time T (sec) and a control signal from a counter 707. In addition, the shading correction circuit 108 acquires a horizontal sync signal (HD) and a vertical sync signal (VD) from the image sensing device drive circuit 107.

The zoom movement speed may, for example, be the time required for the zoom lens to move between two discrete and adjacent zoom lens positions for which shading correction tables are provided. Here, as in the first embodiment, the time required for the lens to move between adjacent ZoomPositions is expressed as (Z_sp).

In addition, the frame rate corresponds to the vertical sync signal cycle that drives the image sensing device. The vertical sync includes vertical sync signals corresponding to each of a plurality of read-out systems employed by the image sensing device, and therefore the frame rate also changes depending on the read-out system employed. Here the frame rate is expressed as (T_f).

A frame number calculation circuit 701 newly provided in the present embodiment calculates the number of frames sensed during movement of the zoom lens from ZoomPosition_M1 to z2 (moving image sensed frame number) Fn. Specifically, Fn=(Z_sp)/(T_f).

The counter 707 starts counting the vertical sync signals (VD) from the image sensing device drive circuit 107 when operation of the zoom bar starts and stops counting when operation of the zoom bar stops. The count value that is the output of the counter 707 is x. In addition, when the zoom position reaches a ZoomPosition, the counter 707 is reset and x becomes 0. Therefore, the maximum value for x is equivalent to Fn. The control unit 112 generates a counter 707 count start signal and a reset signal. It should be noted that, in the following description, it is assumed that the zoom direction between adjacent ZoomPositions is constant. Alternatively, however, where a reversal of zoom direction between adjacent ZoomPositions is permitted, the counter may be configured so as to reduce the count value during zoom image sensing in the reverse direction.

In the present embodiment as well, the basic concept is the same as that of the first embodiment. In other words, if the zoom position at the time a given frame is sensed (the start of exposure) is not one of the discrete ZoomPositions for which a shading correction value is provided in advance, then a predetermined amount of weighting is performed on the shading correction values prepared for the ZoomPositions nearest to the zoom position at the time the image is sensed in both the telephoto direction and in the wide-angle direction, and the correction value thus calculated is then applied to that zoom position. However, in this embodiment, since zoom positions that are not ZoomPositions but which lie intermediate between ZoomPositions cannot be detected, an accumulation value x that represents the total number of frames sensed while zooming to that zoom position from the nearest ZoomPosition is used as the value that corresponds to that intermediate zoom position. The coefficient used in the weighting is obtained by a correction weighting coefficient calculation circuit 702.

The correction weighting coefficient calculation circuit 702 calculates the weighting coefficient a multiplied by the shading correction table for ZoomPosition_M1 and the weighting coefficient b multiplied by the shading correction table for ZoomPosition_M2. The former table Sh_M1 is stored in the RAM1 (113) and the latter table Sh_M2 is stored in the RAM2 (114).

The weighting coefficient a is multiplied by a multiplier 703 and the coefficient b is multiplied by a multiplier 704, and both products are added by an adder 705. Thereafter, at a multiplier 706, the sum obtained by the adder 705 is multiplied by the A/D circuit output signal and shading correction is performed on one frame during zoom lens movement. This operation calculates weighting coefficients for each and every frame through which the zoom lens moves between zoom lens stopping positions.

In the present embodiment, the method of calculating the weighting coefficients (a,b) by which the values stored in the shading correction tables are multiplied is as follows:

$$a = (Fn-x)/Fn + 0.5*(T/Z\_sp)$$

$$b = x/Fn - 0.5*(T/Z\_sp)$$

where T is the exposure time (in seconds) and (T/Z_sp)≦1.

Therefore, the shading correction amount for a given frame located between ZoomPosition_M1 and ZoomPosition_M2 is:

$$Sh\_table = Sh\_M1*\{(Fn-x)/Fn+0.5*(T/Z\_sp)\} + Sh\_M2*\{x/Fn-0.5*(Z\_sp)\} \quad (3)$$

When the zoom lens movement speed is slow, or when the exposure time is short, if (T/Z_sp) is sufficiently small, then the shading correction value can be approximated in the following manner:

$$Sh\_table \approx Sh\_M1*(Fn-x)/Fn + Sh\_M2*x/Fn \quad (4)$$

As a result, the coefficient can be produced with the correction weighting coefficient calculation circuit 702 shown in FIG. 7 so as to compare (T/Z_sp) to a predetermined value and carry out correction, using either the shading correction value according to the approximation method (equation (4)) where (T/Z_sp) is smaller than the predetermined value or the shading correction value obtained using equation (3) where (T/Z_sp) is greater than the predetermined value.

The shading correction process of the present embodiment can be implemented by changing some of the steps in the flow chart shown in FIG. 8 described in the first embodiment, specifically, by acquiring the counter 707 value x in place of detecting the position of the zoom lens in step S203, and using equation (3) or equation (4) in the calculations of the weighting coefficients in step S207.

In addition, the present invention has the advantage that it can also be implemented in a system or image sensing apparatus capable of detecting the position of the zoom lens at gross intervals and still achieve the same effect as with the first embodiment.

In addition, shading correction according to the present embodiment enables an apparatus that cannot obtain position information during movement of the zoom lens to ascertain the zoom lens position with ease and to obtain the proper shading correction coefficient during zoom lens movement by counting the frame rate and the zoom movement speed as well as the vertical sync signals.

It should be noted that the method of calculating the shading correction value of the present embodiment is also applicable to an apparatus capable of detecting zoom lens positions more finely, like the apparatus described in the first embodiment. In that case, shading correction values employing the weighting coefficients according to equation (3) or equation (4) may be used for frame images sensed at intermediate positions between the discrete zoom positions for which shading correction values have been prepared.

Other Embodiments

It should be noted that, in the above-described embodiments, where the zoom position is equivalent to the ZoomPosition, it is assumed that the weighting coefficients (a,b)=(1,0) and that shading correction using correction values prepared in advance and stored in the RAM1 is performed. However, alternatively, where the zoom lens position is equivalent to the ZoomPosition, a correction value read out from the ROM115 or the RAM1 may be supplied directly to the multiplier 206 (706).

It should be noted that the present invention also includes an instance in which a software program that implements the capabilities of the embodiments described above is supplied by wire or wireless communications to a shading correction apparatus or an image sensing apparatus having a computer capable of executing such program, and the same capabilities are achieved by the image sensing apparatus executing such supplied program.

Accordingly, since the functional processes of the present invention are implemented by a computer of an apparatus having a shading correction capability, the program supplied to and installed in the computer itself also accomplishes the present invention. In other words, the computer program for implementing the functional processes of the invention is itself also included within the scope of the present invention.

In that case, so long as the system or apparatus has the capabilities of the program, the program may be executed in any form, such as an object code, a program executed by an interpreter, or scrip data supplied to an operating system.

Examples of storage media that can be used for supplying the program are magnetic storage media such as a floppy disk, a hard disk, or magnetic tape, optical/magneto-optical storage media such as an MO, a CD-ROM, a CD-R, a CD-RW, a DVD-ROM, a DVD-R, or a DVD-RW, and a non-volatile semiconductor memory or the like.

As for the method of supplying the program using wire/wireless communications, there is, for example, a method in which a data file (program data file), either a computer program itself that forms the invention or a file or the like that is compressed and automatically installed, and capable of becoming the computer program that comprises the invention on a client computer, is stored on a server on a computer network, and the program data file is downloaded to a connected client computer. In this case, the program data file may be divided into a plurality of segment files and the segment files distributed among different servers.

In addition, the implementing apparatus and an external computer may be connected directly to each other and a software program that comprises the present invention downloaded to the non-volatile semiconductor memory in the implementing apparatus from the external computer.

As many apparently widely different embodiments of the present invention can be made without departing from the spirit and scope thereof, it is to be understood that the invention is not limited to the specific embodiments thereof except as defined in the appended claims.

This application claims the benefit of Japanese Patent Application No. 2005-120009, filed on Apr. 18, 2005, which is hereby incorporated by reference herein in its entirety.

What is claimed is:

1. A shading correction apparatus performing shading correction of an image sensed while driving a zoom lens, comprising:

a storage unit that stores shading correction values at a plurality of discrete zoom positions determined in advance from among all possible zoom positions of the zoom lens;

a calculation unit that calculates a shading correction value to be applied to an image for which the zoom position at the time the image was sensed is not one of the plurality of discrete zoom positions using the shading correction values stored in the storage unit; and a correction unit that applies the shading correction value calculated by the calculation unit to the image, wherein the calculation unit determines a zoom lens position at the time the image was sensed based on a zooming speed of the zoom lens at that time and calculates the shading correction value corresponding to the determined zoom lens position.

2. The shading correction apparatus according to claim 1, wherein the calculation unit determines the zoom lens position by also considering the exposure time at the time the image was sensed and performs shading correction.

3. The shading correction apparatus according to claim 1, wherein the calculation unit calculates the shading correction value to be applied to the image for which the zoom position at the time the image was sensed is not one of the plurality of discrete zoom positions, using shading correction values corresponding to a pair of the discrete zoom positions closest to the zoom position at the time the image was sensed in a telephoto direction and a wide-angle direction.

4. The shading correction apparatus according to claim 1, further comprising a zoom position detection unit that determines the zoom position at the time the image was sensed from a number of frames of the image sensed while zooming after passing a predetermined zoom position among the discrete zoom positions and the number of frames sensed while zooming between the discrete zoom positions adjacent the predetermined zoom position.

5. The shading correction apparatus according to claim 3, wherein the calculation unit calculates the shading correction value to be applied to the image for which the zoom position at the time the image was sensed is not one of the plurality of discrete zoom positions, as a weighted sum of the shading correction values corresponding to the pair of the discrete zoom positions closest to the zoom position at the time the image was sensed in the telephoto direction and the wide-angle direction.

6. An image sensing apparatus comprising:
   a zoom lens;
   an image sensing device that converts an object image entering from the zoom lens into an electrical signal; and
   the shading correction apparatus according to claim 1,
   wherein shading correction is performed on image data generated from an output signal of the image sensing device by the shading correction apparatus.

7. A shading correction method for performing shading correction of an image sensed while driving a zoom lens, comprising: using a computer to perform the following steps:
   a storage step of storing, in a storage unit, shading correction values at a plurality of discrete zoom positions determined in advance from among all possible zoom positions of the zoom lens;
   a calculation step of calculating a shading correction value to be applied to an image for which the zoom position at the time the image was sensed is not one of the plurality of discrete zoom positions, using the shading correction values stored in the storage unit; and
   a correction step that applies the shading correction value calculated in the calculation step to the image,
   wherein the calculation step determines a zoom lens position at the time the image was sensed based on a zooming speed of the zoom lens at that time and calculates the shading correction value corresponding to the determined zoom lens position.

* * * * *